Jan. 12, 1954 H. N. TRUESDELL 2,665,962

CONTAINER FOR STORING AND DELIVERING DISK RECORDS

Filed April 20, 1951

5 Sheets-Sheet 1

Inventor:
Henry N. Truesdell
BY
A. D. T. Libby
Attorney.

Jan. 12, 1954 H. N. TRUESDELL 2,665,962

CONTAINER FOR STORING AND DELIVERING DISK RECORDS

Filed April 20, 1951 5 Sheets-Sheet 2

Inventor:
Henry N. Truesdell

BY

A. D. T. Libby
Attorney.

CONTAINER FOR STORING AND DELIVERING DISK RECORDS

Filed April 20, 1951

Inventor:
Henry N. Truesdell
BY A. D. T. Libby
Attorney.

Jan. 12, 1954 H. N. TRUESDELL 2,665,962

CONTAINER FOR STORING AND DELIVERING DISK RECORDS

Filed April 20, 1951 5 Sheets-Sheet 4

Inventor:
Henry N. Truesdell

BY A. D. T. Libby
Attorney.

Jan. 12, 1954 H. N. TRUESDELL 2,665,962

CONTAINER FOR STORING AND DELIVERING DISK RECORDS

Filed April 20, 1951 5 Sheets-Sheet 5

Inventor:
Henry N. Truesdell
BY
A. D. T. Libby
Attorney.

UNITED STATES PATENT OFFICE 2,665,962

CONTAINER FOR STORING AND DELIVERING DISK RECORDS

Henry N. Truesdell, Irvington, N. J.

Application April 20, 1951, Serial No. 222,097

12 Claims. (Cl. 312—13)

This invention relates to means in the form of a container for storing and delivering phonograph disc records. In the past various arrangements have been utilized for stacking the records on open type racks or in albums that are stacked in racks or the albums are placed in desk drawers but in all these arrangements the discs are easily misplaced and it is hard to find any disc even though it may have the tab number thereon. This mixing up and misplacement of the discs is a common occurrence in families where there are youngsters. Furthermore, the discs with their present method of storage get roughly handled and injured even though they may have a casing thereover or a separator for keeping them separated in a shelf or cabinet drawer, and much time is consumed in finding a record. It is therefore the principal object of my invention to provide a container which will carefully store the records and from which a record may be easily and quickly withdrawn for use. Another object of my invention is to provide a container having means for readily ascertaining what records, including its number and title, are in the container before even opening it up and inspecting the tabs which may be attached to the top of the disc envelope. Another object of my invention is to provide means for holding the records within the container in a new and better manner. These improvements and others will be clear to one after reading the following specification, taken in connection with the annexed drawings wherein, Figure 1 shows a plan view of one form of my invention with a few of the record discs in position;

In the various views, like numbers refer to corresponding parts.

Figures 1, 2, 3, 4, 5, 6, 7, 8:
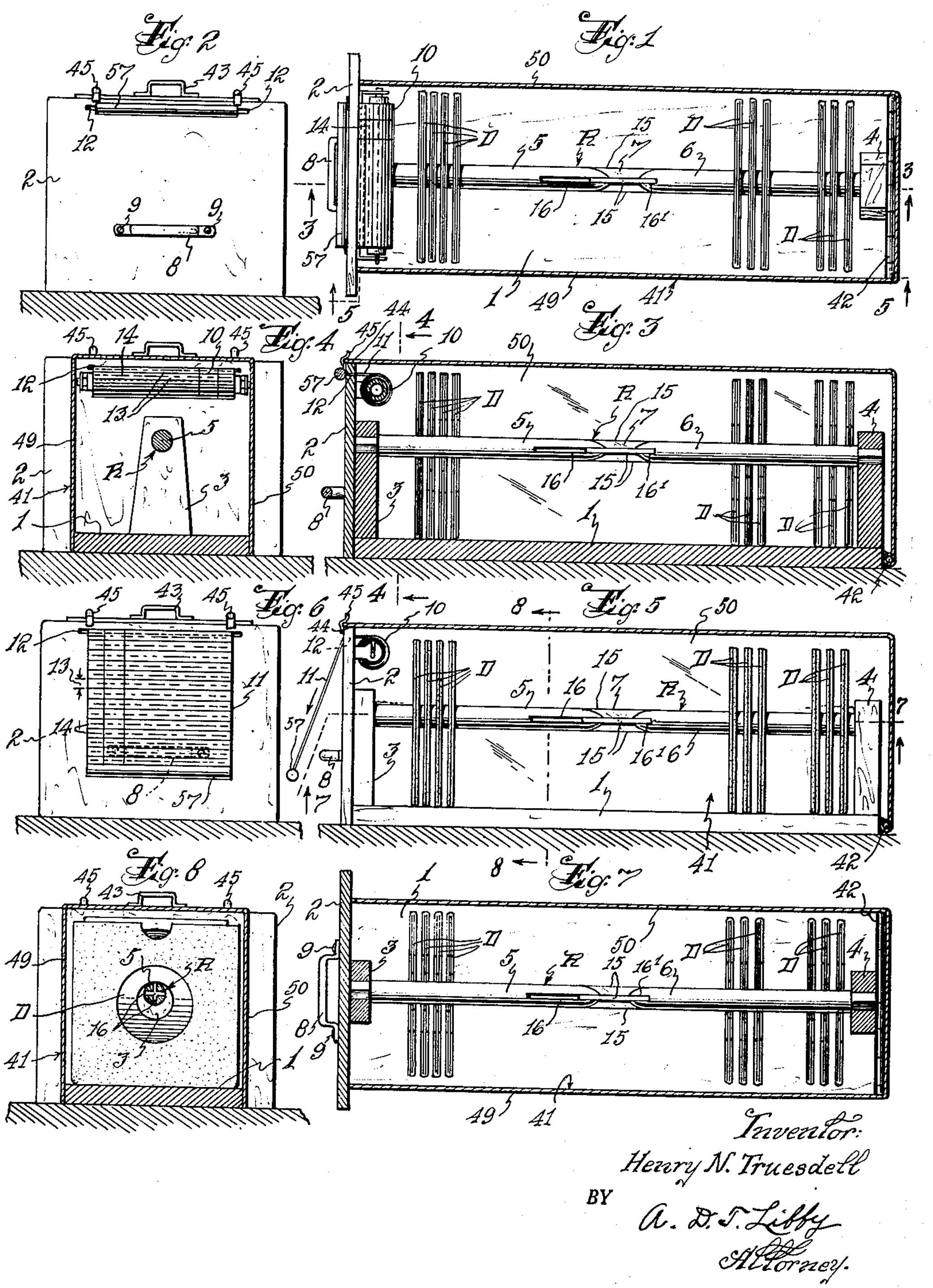
Figure 2 is a view of the left hand end of Figure 1.
Figure 3 is a view on the line 3—3 of Figure 1 showing certain of the parts in section and others in elevation.
Figure 4 is a view on the line 4—4 of Figure 3.
Figure 5 is a view of Figure 1 about on the lines 5—5 of Figure 1; but showing the identification curtain in partly operative position.
Figure 6 is a view of the left hand end of Figure 5.
Figure 7 is a view on the line 7—7 of Figure 5.
Figure 8 is a view on the line 8—8 of Figure 5.

In Figures 1–8 a unit structure is shown consisting of a base 1 and a front end plate 2. Adjacent the front end plate 2 is located a stud or support member 3 while at the rear end of the base 1 is fastened a rear support or stud 4. Between these support studs 3 and 4 is non-rotatably carried a support rod R made up in two sections, 5 and 6 which are joined by a slidable member 7 which is shown more in detail in Figures 16, 17 and 18, to which reference will be later made. While the support stud 3 is shown as an integral piece fastened to the base 1, in a satisfactory manner, the front plate 2 may directly carry the outer end of the rod section 5. To the front plate 2 is attached a handle 8 in a satisfactory manner as by screws 9. The handle 8 is utilized for slidably operating the unit in a manner and for the purpose to be later described. Carried on the front plate 2 at its top is a curtain roll 10. The free or pull end of the curtain 11 passes through a slot 12 in the top part of the plate 2. As shown in Figure 6 the curtain is divided into spaces 13 as shown by the full lines and between these full lines as indicated by the broken lines 14, the number and name of the phonograph record disc D may appear. It is to be understood that the phonograph records have a sizable central hole therein so that they can be mounted on the rod R which is positioned above the base 1 so that the discs D can be slid along on the rod R very freely. As shown in Figures 1, 3, 5, and 7 the discs D are positioned in a protecting suitable paper envelope open at the top, whereby the record may be withdrawn for placement on a phonograph. As shown in Figure 8 the clearance between the rod R and the hole in the disc D is given by way of figures. The hole in the discs is approximately 1½ inches in diameter while the diameter of the sections 5 and 6 of the rod R is ¾ of an inch, which I have found to be satisfactory for the purpose. It may be mentioned at this point, that the base 1, plate 2 and rod sections 5 and 6 as well as support members 3 and 4 may be made of any satisfactory material such as wood or plastic.

Figures 9, 10, 11, 12, 13:
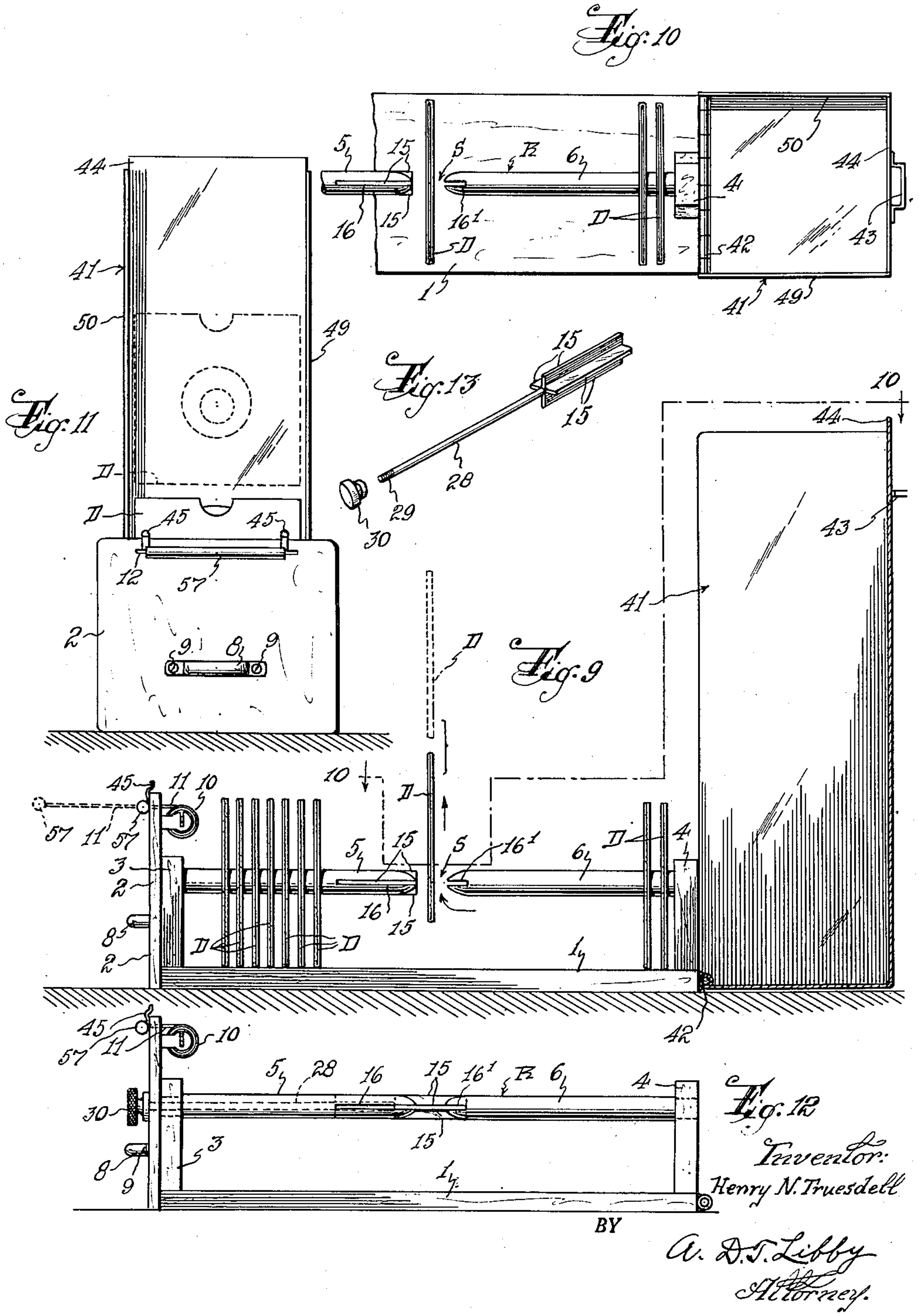
Figure 9 is a view of the structure shown in Figure 1 but with a hinge cover, the same being shown in open position, and with one of the records being removed from the container as shown by the arrows.
Figure 10 is a view on the line 10—10 of Figure 9.
Figure 11 is a view of Figure 9 looking from left to right.
Figure 12 is a view similar to Figure 3 but of a modified form of construction.
Figure 13 is a view of one of the parts shown in Figure 12 for actuating the support rod control that carries the discs.
Figures 14, 15, 16, 17, 18:
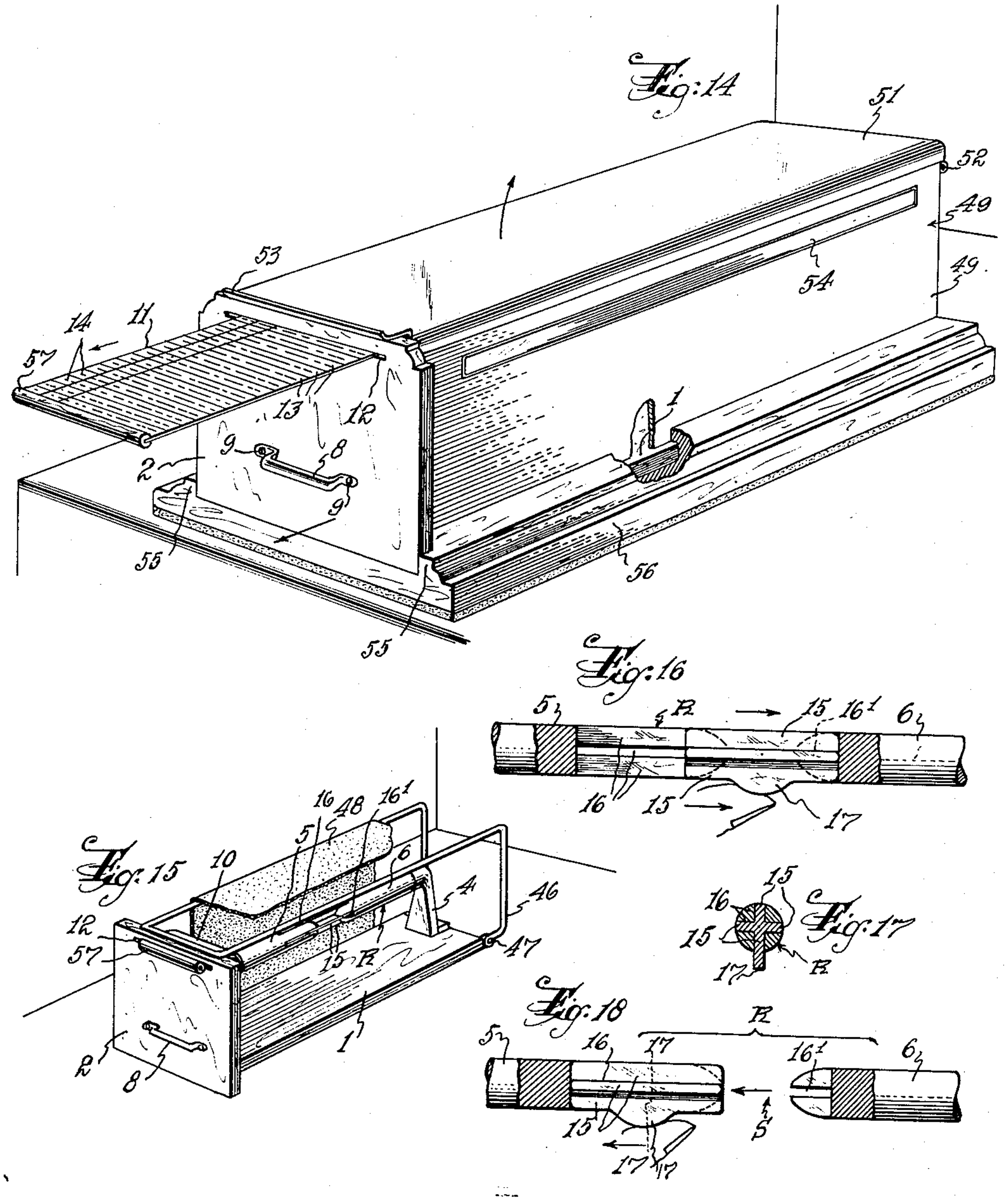
Figure 14 is a perspective view of the units shown in Figures 1–7 completely enclosed in a container, the unit being slidably mounted on a suitable base and with a hinge cover, also with sight means for seeing inside the approximate number of discs within the container.
Figure 15 is a view of the support unit shown in skeleton form with a wire cover frame hinged to the bottom of the unit and only a portion of the cover being shown.
Figure 16 is a detailed view of a portion of the support rods carrying the disc within the container, this portion showing the means for removing a disc from its support rod and the container.
Figure 17 is a view on the line 17—17 of Figure 18.
Figure 18 shows the parts of Figure 16 in different position forming an opening from which a disc may be withdrawn.

The slidable member 7 in the form shown in Figures 16, 17 and 18 is made up of four wings 15, preferably at right angles and these wings are adapted to engage slots 16 in the rod section 5 and the slots 16′ in the rod section 6. In order to make it very easy to operate this slide 7, one of the wings 15, preferably the bottom one, may have an arcuately formed projection 17 which may be engaged by a finger or thumb of an operator whereby the slide 7 may be moved to open position as shown in Figure 18 and when so moved, the opening or space S is quite ample to take either one or several of the discs from the support rod R but it is to be understood that a person wanting a disc would look on the curtain first and see the name and number of the discs desired, and the discs themselves, on an upper corner will have the number marked thereon or the disc envelope may have a tab, not shown, attached thereto so that the record disc desired may be quickly ascertained and removed from the unit. A still further modified construction of the slidable member 7 is shown in Figures 12 and 13 wherein the member 7 has an extension pin 28 passing out through the front support rod 5 to the plate 2. The outer end of the pin 28 is threaded at 29 to receive a thumb nut 30 whereby when it is desired to put on or take off the discs from the support rod R, the thumb nut 30 is seized and pulled outwardly to move the slidable member 7 to open position, closure being made by pushing on the thumb nut 30.

I have found a very convenient unit such as so far been described, that is approximately two feet long by eight inches wide to handle records that are approximately seven inches in diameter, such a unit as described being able to take care of 150 to 200 of these record discs with their protecting envelopes.

I have also found that it is advisable to have the disc unit covered and such a cover is indicated in Figure 9 where the cover 41 is shown hinged at 42 to the base member 1. The top part of the cover has a handle 43 and a projecting lip 44 adapted to engage a snap holding springs 45 mounted on the top part of the front plate 2 to hold the cover in a closed position. In Figure 15 the cover is shown as made up of a wire spring 46 pivoted to the base 1 at 47. The wire is bent or looped around over the front plate 2 and is adapted to rest thereon in closed position. The cover 48, of suitable material such as canvas or the equivalent, is formed over and fastened to the wire frame, only a portion of the cover being shown in order to show the interior parts of the unit. In Figure 14 the unit is provided with longitudinal side members 49 and 50 which for illustrative purposes in Figure 14 are shown in Figures 1, 3, 5, and 7. To the side portions 49 and 50, the latter of which does not show in Figure 14, is attached a cover 51 which is pivoted at 52. This cover is preferably made of metal and has a folded up lip 53 that is adapted to pass over the top of the end piece 2. Also either one of the side members 49 or 50 or top 51 is provided with a transparent window plate 54 so that the user can see inside the container for determining the number of record plates therewithin. In this construction the unit is shown mounted on a sub-base or member having oppositely disposed slide rails 55 so as the sub-base 56 is fixedly mounted within a cabinet of some kind, the unit may be withdrawn by pulling on the handle 8. The curtain 11 is shown drawn through the slot 12 through the medium of a small circular member 57 attached to the free end of the curtain, it being understood that the member 57 is large enough in diameter so as not to pass through the slot 12 but will hold the end of the curtain in position so that it may be quickly withdrawn.

Figures 19, 20, 21, 22, 23:
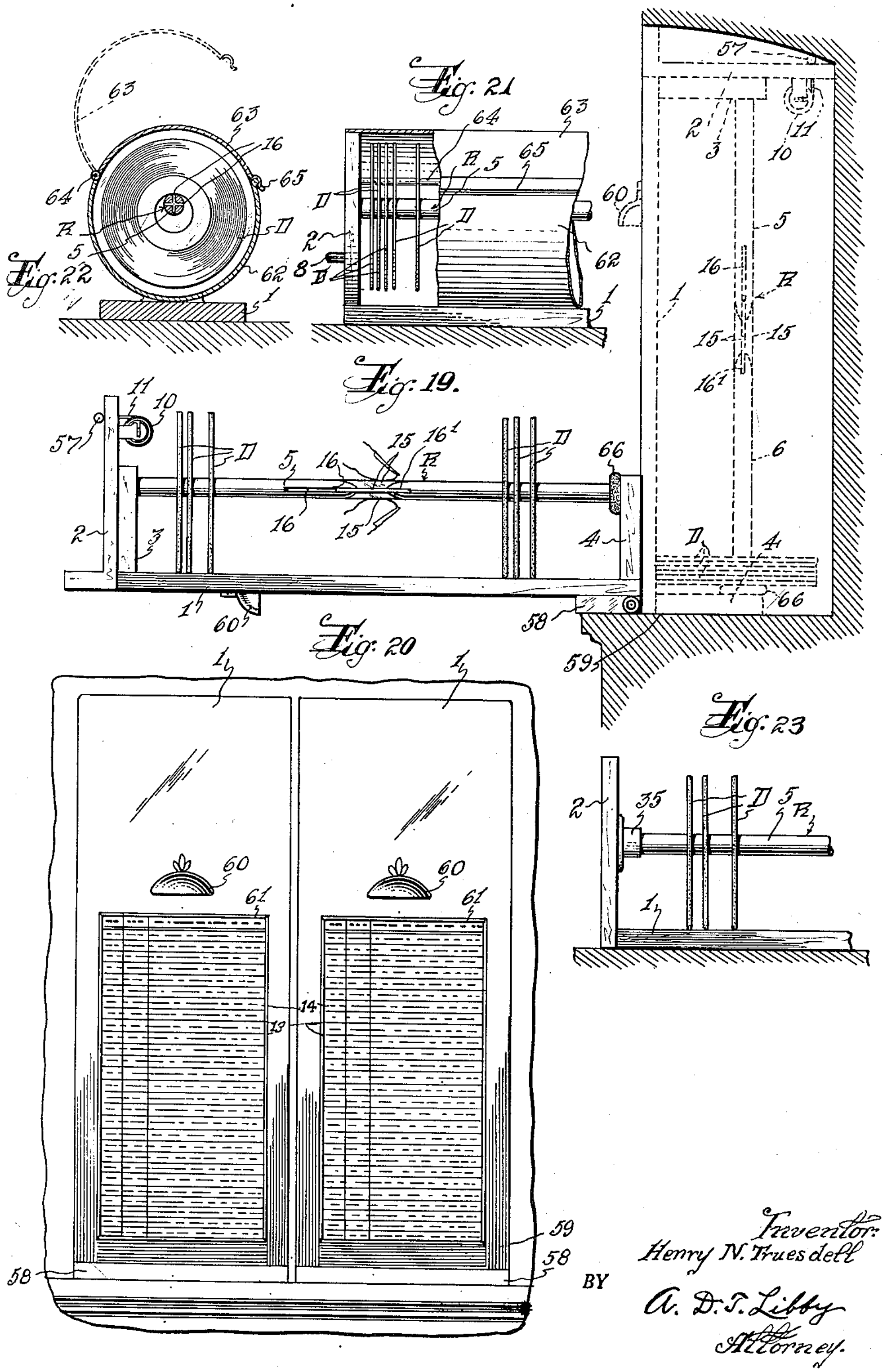
Figure 19 shows a covered unit adapted to set into a recess in a wall, the cover being pivotally mounted so that the unit may be turned down to horizontal position to get a disc record.
Figure 20 is a front view of a pair of wall recess units such as shown in Figure 19, with the designation curtains being at least partially withdrawn.
Figure 21 shows partial view of a modified form of unit having preferably a metallic cover portion being broken away to show the interior mounting on the control rod of one of the forms heretofore defined.
Figure 22 is a view of Figure 21 looking from left to right with a section of the cover being shown in partially open position.
Figure 23 shows a modified form of the disc support rod mounting.

In Figure 19 the unit is shown pivoted to a member 58 that is positioned in a recess 59 in a wall structure. A buffer 66 is used to reduce the shock on the discs when moving the unit into the recess. In this arrangement the handle 60 is utilized for rotatably moving the unit out of the wall recess. In Figure 20 two of these vertically mounted units are illustrated. In this construction, the curtain 11 can be dispensed with and the number and designation sheet 61 fastened to the bottom 1 of the unit.

In Figures 21 and 22 I have shown a circular metal cover 62 fastened in any satisfactory manner to the base 1. The upper part 63 of this circular cover is pivoted at 64 so that the portion 63 which is normally held in place by a lip 65 engaging a suitable formation on the cover 62, can be moved to open position as shown by the broken lines.

Figures 24, 25:
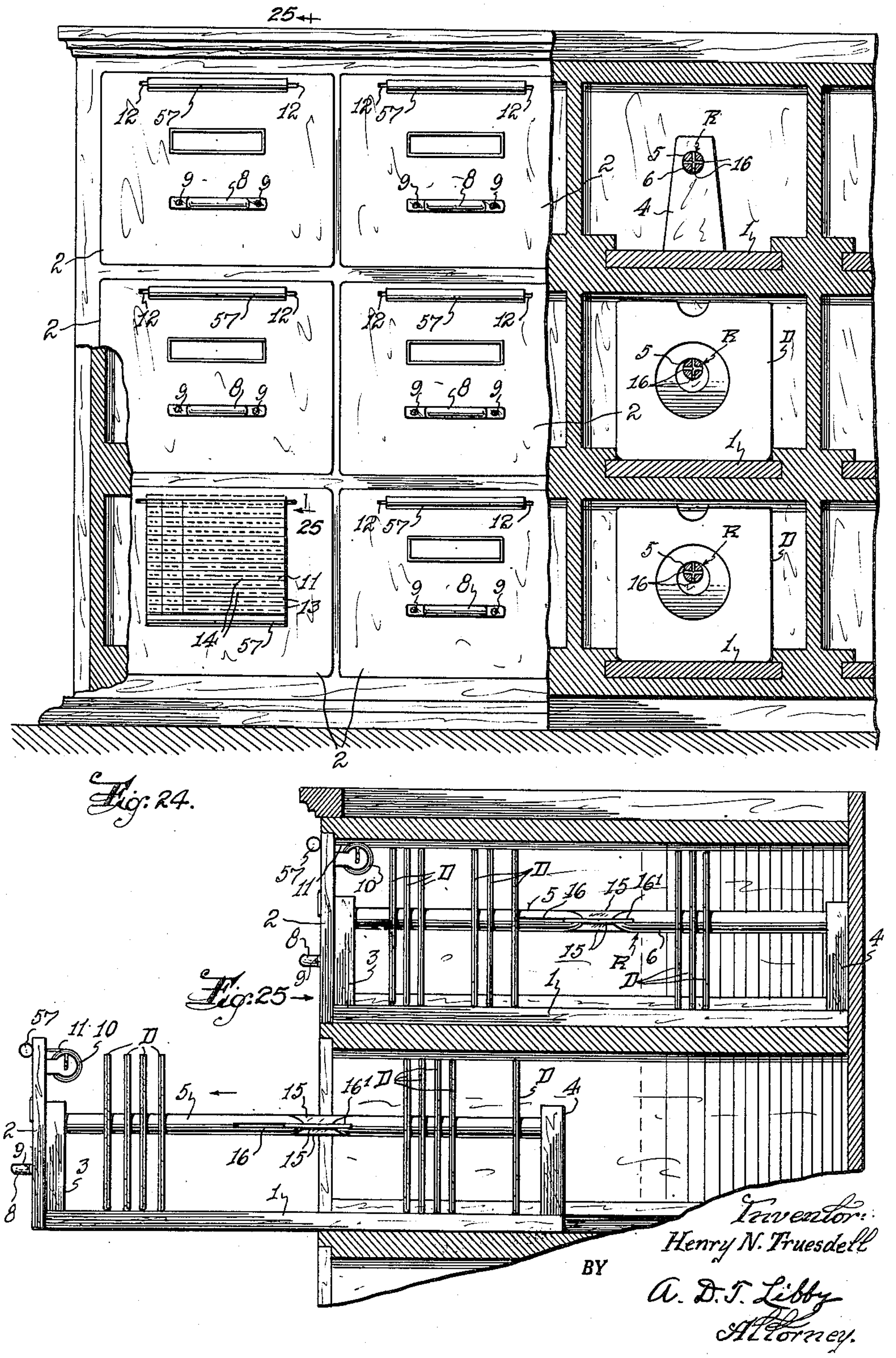
Figure 24 is a view partially in section and partially in elevation of a cabinet construction in which a plurality of units such as shown in Figures 1–7 can be mounted vertically and horizontally.
Figure 25 is a view on the line 25—25 of Figure 24 but with one of the units withdrawn to approximately record removable position.

In Figure 24 I have illustrated how a plurality of units can be slidably arranged in horizontal and vertical positions in a suitable cabinet.

In Figure 25 two of the top units at the left side of Figure 24 are illustrated part in section and part in elevation with one of the units being withdrawn to give access to the record discs.

From what has been said it will be appreciated that many of the details may be varied without departing from my invention and the scope of the appending claims.

Having thus described my invention, what I claim is:

1. A container for storing and delivering disc records having the usual central hole therein, including a support plate having a vertically extending support stud at each end of the same side of the support plate, a disc support rod having a curvilinear shape carried by said studs at a distance above said plate sufficient to carry the discs free from the plate when they are located on said rod through the medium of the central hole in each disc, said rod being in two sections of the same diameter much less than the central hole in the discs whereby the discs engage only the upper surface of the rod over a very short arc length approximately as defined herein, said rod sections having at least one longitudinal slot at their inner ends and these ends being interconnected only by a slidable member having the same diameter as the rod sections and also having at its opposite ends a formation to fit into the slots in the rod section ends, so the discs can be slid along the rod with absolute smoothness and without scrubbing the inner edges of the central hole in the discs, the slidable member being movable to leave a gap adjacent at least one end of one of the rod ends whereby a selected disc may be quickly moved off the rod end through said gap which can then be quickly closed by moving the slidable member back to full rod position.

2. A disc record container as set forth in claim 1 further defined in that the slidable member has a plurality of longitudinally extending slots that are arcuately arranged while the slidable member has arcuately positioned parts of uniform thickness that will readily slip into the said slots in the rod ends as and for the purpose described.

3. A disc record container as set forth in claim 1 further defined in that the slidable member has a stem projecting through the front rod section and front plate with means on the projecting end of the stem for operating the slidable member for the purpose described.

4. A disc record container as set forth in claim 1 further defined in that there is a means on the slidable member to be engaged by a finger or thumb of an operator for moving the slidable member, said means being of a form and located so that it will not interfere with the sliding of the discs on the rod sections.

5. A unit container as set forth in claim 1 further defined in that the front plate carries a curtain or the like on which the number of the discs appears along with the name thereof or other information.

6. A unit container for storing and delivering disc records having the usual central hole therein, said unit, including a slidable base having a front plate with a handle for sliding the unit, a front support located at the inner side of the plate, a support at the rear of the base and in alignment with the front support, a two section disc support rod extending between said front and rear supports, said rod sections having equal diameters exceedingly less than the central hole in the discs as and for the purpose described herein, said rod sections being vertically spaced from the base so discs mounted on the rod will sufficiently clear the base so they can be slid along the rod sections and movable means having the same diameter as said rod sections and operatively connected to the inner ends of said rod sections so as to present an absolutely smooth surface for said central holes in the discs to slide on without any injury to said disc holes so said means can be moved to make an opening through which a disc may be passed.

7. A unit container as set forth in claim 6 further defined in that the base of the unit is hinged to a cover whereby on moving the parts on the hinge all the record discs are exposed.

8. A unit container as set forth in claim 6 further defined in that an arcuately formed metal cover is fastened to the base while the upper portion of the cover is hinged so it can be moved to open position.

9. A unit container as set forth in claim 6 further defined in that a cover is hinged to the rear of the base, said cover being preferably formed of a single piece of wire having its ends pivoted to opposite sides of the base at the rear end and looped over the front end plate and a sheet of suitable flexible material fastened to said wire.

10. A unit container as set forth in claim 6 further defined in that the base of the unit is hinged to a cover whereby on moving the parts on the hinge all the record discs are exposed and further defined in that a vision glass is located on at least one surface of the cover.

11. A unit container for disc records as set forth in claim 6, further defined in that the unit has a cover hinged to the base so the base or the cover may be pivotally moved depending on the character of the place in which the unit is kept.

12. A unit container for disc records as set forth in claim 6, further defined in that the unit base is such that the whole unit is slidable and adapted to be mounted in a wall recess, or vertically or horizontally in a suitable framework.

HENRY N. TRUESDELL.

References Cited in the file of this patent

UNITED STATES PATENTS

| Number | Name | Date |
|---|---|---|
| 338,268 | Henry | Mar. 23, 1886 |
| 660,432 | Henkel | Oct. 23, 1900 |
| 1,014,021 | Niebling | Jan. 9, 1912 |
| 1,197,349 | Curtis | Sept. 5, 1916 |
| 1,208,346 | Marsh | Dec. 12, 1916 |
| 1,340,364 | Bentley | May 18, 1920 |
| 2,250,454 | Babcock | July 29, 1941 |
| 2,278,214 | Pearson | Mar. 31, 1942 |
| 2,287,418 | Dudley | June 23, 1942 |

FOREIGN PATENTS

| Number | Country | Date |
|---|---|---|
| 336,014 | France | Dec. 29, 1903 |